(12) United States Patent
Schilstra

(10) Patent No.: US 12,108,191 B1
(45) Date of Patent: Oct. 1, 2024

(54) SYSTEM AND METHOD FOR DROP-IN VIDEO COMMUNICATION

(71) Applicant: Christina Schilstra, Ellicott City, MD (US)

(72) Inventor: Christina Schilstra, Ellicott City, MD (US)

(73) Assignee: SoHive, Brunswick, MD (US)

( * ) Notice: Subject to any disclaimer, the term of this patent is extended or adjusted under 35 U.S.C. 154(b) by 0 days.

(21) Appl. No.: 18/407,795

(22) Filed: Jan. 9, 2024

(51) Int. Cl.
| | | |
|---|---|---|
| *G06F 3/0488* | (2022.01) | |
| *G06F 3/04817* | (2022.01) | |
| *H04N 7/14* | (2006.01) | |
| *H04N 7/15* | (2006.01) | |

(52) U.S. Cl.
CPC ......... *H04N 7/152* (2013.01); *G06F 3/04817* (2013.01); *G06F 3/0488* (2013.01); *H04N 7/147* (2013.01)

(58) Field of Classification Search
CPC ...... G06F 3/04817; G06F 3/0488; G06F 1/16; G06F 3/0416; G06F 3/0428; G06F 3/0446; G06F 3/0482; G06F 3/04883; G06F 3/0608; G06F 40/186; H04L 51/04; H04L 63/0807; H04L 65/1073; H04L 65/1093; H04L 51/222; H04L 65/1083; H04L 65/403; H04L 67/02; H04L 67/5682; H04N 7/142; H04N 7/147; H04N 7/148; H04N 7/152; H04N 21/44; H04N 21/8133; H04N 7/157; H04N 21/25891; H04N 21/41407; H04W 76/10; G05B 19/0426; G06Q 30/00; H04B 1/202; H04M 3/42374

See application file for complete search history.

(56) References Cited

U.S. PATENT DOCUMENTS

| | | | | |
|---|---|---|---|---|
| 5,453,926 | A * | 9/1995 | Stroschin | G05B 19/0426 700/83 |
| 7,036,082 | B1 * | 4/2006 | Dalrymple | H04L 51/222 370/352 |
| 8,780,163 | B2 | 7/2014 | Cahill et al. | |
| 8,848,026 | B2 | 9/2014 | DeLand | |
| 9,077,677 | B2 | 7/2015 | Mackin | |
| 9,264,662 | B2 | 2/2016 | Shapiro | |
| 9,342,253 | B1 * | 5/2016 | Muthukkaruppan | G06F 3/0608 |
| 9,479,726 | B2 * | 10/2016 | Devereaux | H04W 76/10 |

(Continued)

FOREIGN PATENT DOCUMENTS

EP    2624165 A1    8/2013

*Primary Examiner* — Gerald Gauthier
(74) *Attorney, Agent, or Firm* — Tariq S. Najee-ullah; Gibraltar Consulting LLC

(57) ABSTRACT

The system and methods disclosed include a Drop-In Video-as-a-Service (DIVaaS) system that provides two-way video-based communications on demand, such as instant, interactive video conferences. Drop-in video sessions can be added directly to business websites (e.g., Live Office Hours), shared and accessed via a URL or activated from the SoHive app or website. The Drop-In-Video-as-a-Service (DIVaaS) system is distinctly designed to provide "drop-in" video sessions that do not require having a prior awareness of all participants (e.g., names, phone numbers, email addresses, etc.) or prompting the participants (e.g., emailing each participant prior to the video conference) in order to access the video communication session in a manner that supports spontaneous inclusion and collaboration globally.

18 Claims, 12 Drawing Sheets

(56) References Cited

U.S. PATENT DOCUMENTS

| | | | |
|---|---|---|---|
| 9,577,836 B1 | 2/2017 | Leske et al. | |
| 9,723,130 B2 | 8/2017 | Rand | |
| 9,880,735 B2* | 1/2018 | Dascola | G06F 3/04817 |
| 11,122,311 B2* | 9/2021 | Liu | H04N 21/25891 |
| 11,412,014 B1* | 8/2022 | Paul | H04L 65/1093 |
| 2004/0262051 A1* | 12/2004 | Carro | G06F 3/0446 |
| | | | 178/18.05 |
| 2005/0195173 A1* | 9/2005 | McKay | G06F 1/16 |
| | | | 345/173 |
| 2006/0232663 A1* | 10/2006 | Gandhi | H04N 21/41407 |
| | | | 348/14.02 |
| 2007/0229465 A1* | 10/2007 | Sakai | H04B 1/202 |
| | | | 345/173 |
| 2010/0205540 A1* | 8/2010 | Gupta | H04N 7/157 |
| | | | 715/753 |
| 2012/0169776 A1* | 7/2012 | Rissa | G06F 3/04883 |
| | | | 345/672 |
| 2013/0002799 A1* | 1/2013 | Mock | H04N 7/142 |
| | | | 348/E7.083 |
| 2013/0002800 A1* | 1/2013 | Mock | G06F 3/04883 |
| | | | 348/E7.083 |
| 2013/0002801 A1* | 1/2013 | Mock | G06F 3/0488 |
| | | | 348/E7.083 |
| 2013/0002802 A1* | 1/2013 | Mock | G06F 3/04883 |
| | | | 348/E7.083 |
| 2013/0019297 A1* | 1/2013 | Lawson | H04L 67/02 |
| | | | 726/7 |
| 2013/0072153 A1* | 3/2013 | Lawson | H04M 3/42374 |
| | | | 455/410 |
| 2013/0244784 A1* | 9/2013 | Assa | G06F 3/0416 |
| | | | 463/40 |
| 2014/0044123 A1* | 2/2014 | Lawson | H04L 63/0807 |
| | | | 370/352 |
| 2014/0111597 A1* | 4/2014 | Anderson | H04L 65/1073 |
| | | | 348/14.03 |
| 2014/0298237 A1* | 10/2014 | Galu, Jr. | G06F 3/0482 |
| | | | 715/773 |
| 2015/0153951 A1* | 6/2015 | Kim | G06F 3/0488 |
| | | | 715/773 |
| 2015/0188928 A1 | 7/2015 | Shapiro | |
| 2015/0296092 A1* | 10/2015 | Jeong | G06F 3/0488 |
| | | | 358/1.15 |
| 2016/0073059 A1* | 3/2016 | Bader-Natal | H04N 7/148 |
| | | | 348/14.03 |
| 2016/0179343 A1* | 6/2016 | Shein | G06F 3/04817 |
| | | | 715/760 |
| 2016/0269254 A1* | 9/2016 | Forney | H04L 65/403 |
| 2016/0269450 A1* | 9/2016 | Tondepu | H04L 65/1083 |
| 2016/0269451 A1* | 9/2016 | Houchen | H04L 65/403 |
| 2016/0269503 A1* | 9/2016 | Stott | H04L 67/5682 |
| 2017/0108994 A1* | 4/2017 | Zhang | G06F 3/0428 |
| 2018/0034818 A1* | 2/2018 | Choi | G06F 3/04817 |
| 2018/0091832 A1* | 3/2018 | Zeiler | H04N 21/8133 |
| 2019/0019346 A1* | 1/2019 | Cuthbertson | G06Q 30/00 |
| 2019/0182534 A1* | 6/2019 | Matsuoka | H04N 21/44 |
| 2021/0336912 A1* | 10/2021 | Ahn | H04L 51/04 |
| 2021/0342785 A1* | 11/2021 | Mann | G06F 40/186 |

* cited by examiner

SYSTEM AND METHOD FOR DROP-IN VIDEO COMMUNICATION

FIELD OF DISCLOSURE

The present invention relates generally to multimedia communications, for example a system supporting unprompted videoconferencing sessions.

BACKGROUND OF THE DISCLOSURE

Videoconferencing is a technology that enables real-time audio and video communication between individuals or groups of people who are located in different physical locations. It allows participants to communicate visually and audibly, facilitating virtual meetings, discussions, presentations, and collaborations in a manner that simulates in-person interaction, which typically requires people to be proximately located (e.g., in the same room).

Modern videoconferencing systems offer features like screen sharing, chat, recording, virtual backgrounds, and integration with other tools. The technology has become especially important for connecting people across distances, enhancing remote collaboration, and reducing the need for physical travel. Accordingly, videoconferencing platforms have become pervasive in real-world applications, being an essential communication tool to support modern interconnectivity. Nonetheless, videoconferencing systems that are currently available in the market often require pre-scheduling, personal invitations, or direct links, to enable communications, which requires some prior knowledge of each of the participants (e.g., e-mail address, phone number, etc.) and significantly limits accessibility to video sessions. Therefore, there exists a need in the field for a novel videoconferencing solution that allows access to a videoconference to be unprompted, unscheduled, and without requiring any prior knowledge of all of the participants.

Brief Overview

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are explanatory only and are not restrictive of the disclosure, as claimed.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE DISCLOSURE

Figure 1:
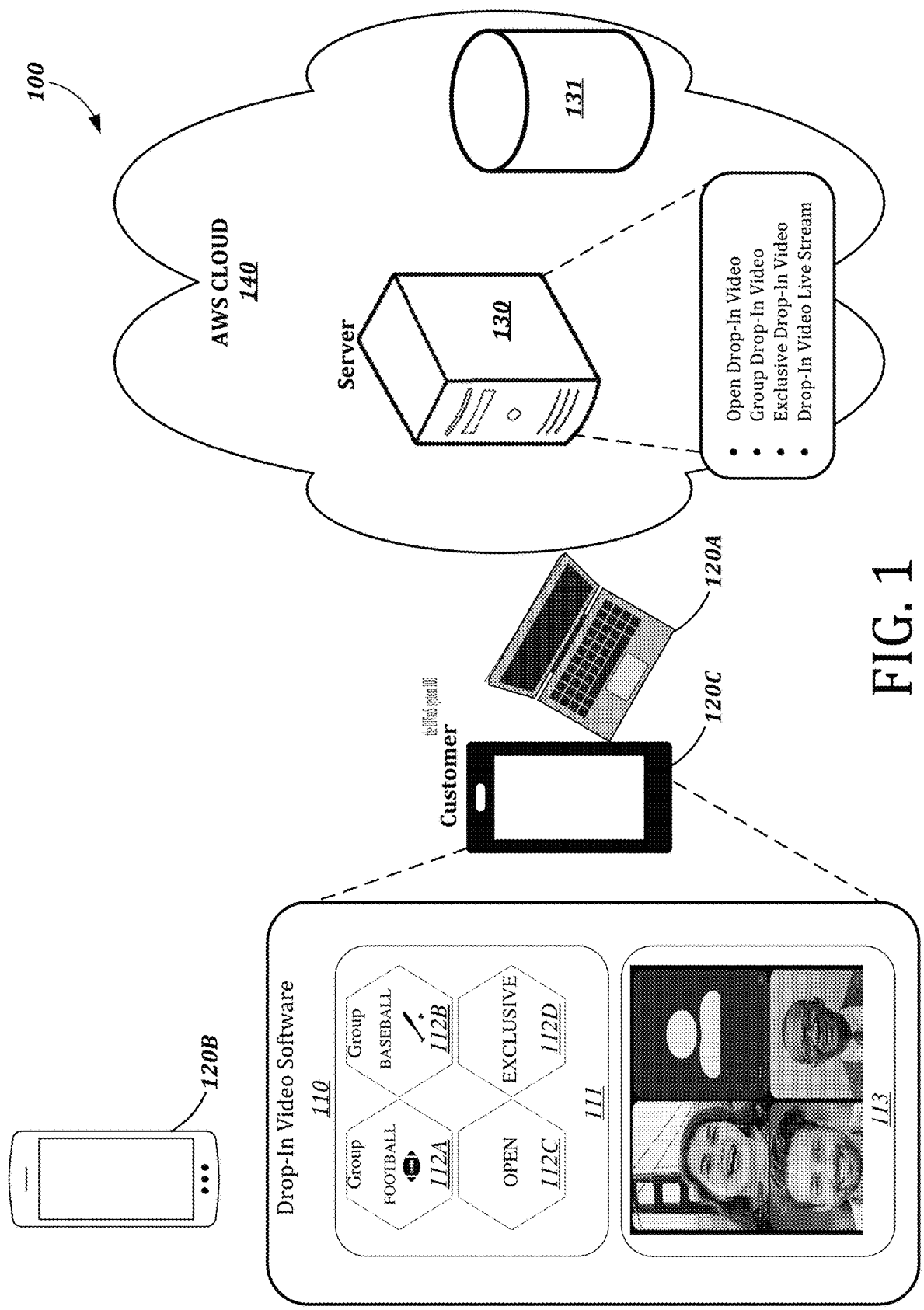
FIG. 1 depicts an example of a communication system in which embodiments disclosed herein may be implemented for providing a Drop-In-Video-as-a-Service (DIVaaS) system that provides unprompted video-based communication between users, according to one or more embodiments shown and described herein.

The present disclosure includes many aspects and features. Moreover, while many aspects and features relate to, and are described in, the context of a drop-in video platform system, embodiments of the present disclosure are not limited to use only in this context. The present disclosure can be understood more readily by reference to the following detailed description of the disclosure and the examples included therein.

Before the present articles, systems, apparatuses, and/or methods are disclosed and described, it is to be understood that they are not limited to specific methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of" Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

With reference now to the drawings, and in particular FIG. 1 through FIG. 4 thereof, examples of the drop-in video platform system and the principles and concepts thereof will be described.

In an embodiment, a drop-in video platform system is implemented to provide instant, two-way, video-based communications, such as video conferences, on demand. The Drop-In-Video-as-a-Service (DIVaaS) system is distinctly designed to provide "drop-in" video sessions in a manner that does not require having a prior awareness of all participants (e.g., names, phone numbers, email addresses, etc.) or prompting the participants (e.g., emailing each participant of the video conference) in order to access the video communication session. For example, SoHive enables a business to offer Live Office Hours, in which a business can specify certain hours of the week for drop-in, instant, interactive video sales or support.

In an embodiment, the DIVaaS system includes a social video software application (app) which offers two-way "drop-in" video sessions that are global and enable spontaneous connections with other users.

In an embodiment, the DIVaaS system is implemented as a Software-as-a-Service solution that utilizes a cloud-based structure having back-end computer systems, such as a server, that are accessible via the cloud and implement the various features of the system, including Open drop-in video sessions (e.g., any topic), Group drop-in video sessions (e.g., specific topics), Exclusive drop-in video sessions (e.g., specific attendees), and live drop-in video sessions (e.g., live streaming). Accordingly, the disclosed DIVaaS system provides a type of flexibility that allows the system and its features to be used in a wide range of environments and use cases.

FIG. 1 depicts an example of a communication environment in which embodiments of the Drop-In-Video-as-a-Service (DIVaaS) system 100, as disclosed herein, may be implemented. In the DIVaaS system 100, there are four personas that use SoHive:

1) Exclusive Hive Owner: The person who purchases the subscription for a SoHive Exclusive Hive.
2) Exclusive Hive Attendee: Any user or participant that drops into a live Exclusive Hive.
3) Exclusive Hive Member: Any user that has subscribed to membership of a specific Exclusive Hive schedule.
4) SoHive User: A general term that refers to any user of SoHive, including any of the personas above.

In the example of FIG. 1, the DIVaaS system 100 is configured to support various communication capabilities for users, particularly enabling drop-in video sessions between multiple users of the system 100. As referred to herein, "drop-in" video is a communication service that allows users to easily join or start video conferences (also referred to as video sessions) without needing to schedule them in advance. For example, the DIVaaS system 100 enables spontaneous, ad-hoc, video communication where participants can "drop-in" to a virtual meeting room or chat without the need for prompts, formal invitations, or prearranged plans. Thus, the DIVaaS system 100 implements several drop-in video features and capabilities that can support a plethora of collaboration tools, virtual events, and social platforms in a manner that facilitates impromptu video-based "face-to-face" interactions.

As disclosed herein, the DIVaaS system 100 is implemented as a Software-as-a-Service solution. Thus, the DIVaaS system 100 utilizes a cloud-based computing model where software applications are hosted, managed via resources on the cloud, and delivered to users of the system 100 over the Internet. In the SaaS model, the DIVaaS system 100 includes software components, including a drop-in video software 110, that are hosted on remote servers, shown as back-end server 130. The back-end server 130 may be maintained by a separate service provider and facilitates building and running various applications and services, namely the drop-in video capabilities described herein. In particular, the DIVaaS system 100 is depicted in FIG. 1 as comprising: computer devices 120a-120c, which are employed by a user and access the drop-in video software 110 hosted by remote server 130 on the cloud 140, for instance on a subscription basis. In the DIVaaS system 100 as shown in FIG. 1, the drop-in video software 110 implements user-facing capabilities of the system 100 including but not limited to: utilizing interactive graphical user interfaces (GUIs) 111-113 to access and participate in a drop-in video session on the user computer devices 120A-120C; utilizing back-end server 130 depicted as a remote server on the cloud (in accordance with the SaaS model) that hosts the software which implements several features and functions that support the drop-in video communication capabilities between users; utilizing data storage 131 depicted as residing on the cloud, and can be utilized by the back-end server 130 to store and/or maintain necessary data to support system 100 functionality.

As a SaaS solution, the DIVaaS 100 allows its software, namely drop-in video software 110, to be accessed and interacted with by a plurality of distributed users via cloud 140. In other words, the DIVaaS system 100 has a cloud-based software delivery model that is cost-effective, accessible, and reduces the need for IT management. It also supports rapid scaling in the event of rapid new user onboarding. In particular, FIG. 1 shows that the drop-in video software 110 can be accessed from the cloud by any of the computer devices 120A-120C having a connection to cloud 140 making it well suited for remote work and collaboration. For example, computer device 120C, which is shown as a tablet, can be owned/operated by an end user, such as a user that desires to participate in a drop-in video session facilitated by the DIVaaS system 100. The user of the tablet 120 can access the drop-in video software 110 as cloud-based software through a web browser, for instance, over cloud 140. FIG. 1 illustrates the cloud as an exemplary Amazon Web Services (AWS) cloud. As an AWS cloud, the cloud 140 is a cloud computing platform provided by Amazon, which offers a wide range of cloud services, including computing power, storage, databases, machine learning, natural language processing, analytics, content delivery and more. These services allow businesses and developers to build, deploy, and scale applications and services easily without requiring the physical infrastructure. Cloud based services may be provided by any commercial service providing the use of on-demand availability of computer system resources, especially data storage and computing power, without direct active management by the user. In one or more instance this may include large clouds often have functions distributed over multiple locations, each of which is a data center.

In some cases, the drop-in video software 110 is implemented as a software application (app) for use with mobile devices having smaller form factors, such as smartphone 120B, for more suitable user interfaces and an improved user experience.

As an example, a user operating tablet 120C can connect to the cloud 140 where the back-end server 130 resides, via a communication network, such as the Internet, in order to access the drop-in video software 110 that is hosted on the cloud. Thereafter, the user can launch the drop-in video software 110 which generates and displays visually interactive components that the user can employ to access and utilize the system's 100 features. For example, the user may desire to spontaneously join a drop-in video session, and therefore launches the drop-in video software 110 which renders and displays a GUI, shown as window 111, on the screen of the tablet 120. The window 111 can be presented on the end user's device as a mechanism to access and interact with the system's 100 features. Further, as seen in FIG. 1, the drop-in video software 110 can generate several clickable icons 112A-112C within window 111, where each icon 112A-112C corresponds to a respective drop-in video session. As described in further detail herein, the DIVaaS system 100 supports various types of drop-in sessions, including: open drop-in video sessions, which are sessions without a specified topic; group drop-in video sessions, which are sessions focused on specific interests people share; and exclusive drop-in video sessions, which are owned by businesses, and enable interactive video discussions pertinent to each specific business. FIG. 1 illustrates these features, showing tablet 120C displaying: an icon 112A corresponding to a group drop-in video session, where the specific topic is football; an icon 112B corresponding to a group drop-in video session, where the specific topic is baseball; an icon 112C corresponding to an open drop-in video session (i.e., topic not defined, any topic allowed); and an icon 112D corresponding to an exclusive drop-in video session (i.e., Hive Owner/business specific). The user can click on any of the aforementioned icons 112A-112D and spontaneously enter (or "drop-in") the corresponding video session that is already in progress, and subsequently (in "one-touch") participate in the two-way video and audio communication with other users within the same session that is facilitated through the cloud. In other words, each icon is assigned to a virtual address that is linked to a continuously available (e.g., 24 hours a day) video session. Thus, the video session can be easily accessed in one-touch by a user (e.g., via "click" of the icon) in a manner that provides a drop-in collaboration experience with other users globally.

As an example, the user of tablet 120C may desire to connect with other users that share an interest in the topic of football in a video chat room environment. Accordingly, the user can click on icon 112A that is displayed on their tablet's 120C screen and enter an active drop-in video session where users are streaming two-way live video and audio of themselves and other media (e.g., images, videos) to have an on-line meet-up discussion on the topic of football. A drop-in video session supported by the DIVaaS system 100 is available continuously, meaning the video session is still accessible after a participant leaves, and thus a drop-in video session can be spontaneously accessed by a user at any time simply by selecting the associated icon, for instance icons 112A-112D.

According to the embodiments, selecting 112D provides a unique link for an Exclusive Hive drop-in video session, for instance a unique Uniform Resource Locator (URL) for a drop-in video session assigned to an icon, establishes a connection to the cloud, to host the video session and facilitates the video and audio collaboration in the session.

FIG. 1 illustrates an example video session 113 that is configured for a user to participate in a drop-in video session supported by the DIVaaS system 100. A drop-in video session that is hosted on the cloud can be reached through a mobile app or a web browser and software application, namely the drop-in video software 110, which generates the virtual environment for the video session 113. Accordingly, the user can participate in a drop-in video session, which includes two-way video/audio and interaction that can be utilized by a participant during the video session. The video session 113 can be configured as a continuous video chat room, video conference, virtual room, virtual meeting space, or other computer-based virtual environment that supports video collaboration and gives attending participants a variety of tools to facilitate collaboration, including instant messaging, application sharing, recording, screen sharing and document sharing capabilities.

For example, the video session 113 can be displayed on the end-user device in a GUI that includes windows configured for: displaying the real-time video feed of the user and the other participants; outputting the audio of their speech; and displaying other media that may be included in the session, like text for a chat. Referring back to the operational example, in response to the user selecting icon 112A to enter a group drop-in video session (directed to the topic of football), the video session 113 is launched. The software 110 can generate a distinct GUI for the video session 113, which displays the streaming video of the individual participants in the "football" drop-in video session to be viewed on the tablet 120C by the user. Thus, the DIVaaS system 100 enables a user to spontaneously "drop-in" a video session without having to be previously scheduled or prompted (e.g., invitation link) which better simulates, in the virtual space, how people tend to collaborate freely and spontaneously in the real-world.

FIG. 1 illustrates that the DIVaaS system 100 can be implemented across different hardware platforms, shown as various computer devices 120A-120C that can be associated with users that may desire to be participants (or attendees) in a drop-in video session. Particularly in the example of FIG. 1, computer device 120A is shown as a laptop computer, computer device 120B is shown as a smartphone, and computer device 120C is shown as a tablet computer. It should be understood that the computer devices 120A-120C are not Intended to be limiting, and components of the DIVaaS system 100 can be implemented on other types of computer devices that are not illustrated FIG. 1, as deemed appropriate.

In an embodiment, the drop-in video software 110 is implemented as a Software as a Service (or SaaS) solution, and thus the software 110 (and any other applications supported by the DIVaaS system 100) can be delivered over the Internet, from the cloud 140 as a service. Thus, the drop-in video software 110 can be considered "cloud-based" software that is hosted, managed, and delivered over a wide-area network, such as the Internet, from one or more remote servers, or cloud 140. For example, the computer devices 120A-120C, can access drop-in video sessions by connecting to the hosting back-end server 130 via a web browser or a software application, namely the drop-in video software 110 (and any other applications supported by the DIVP system 100) from the cloud 140. As a SaaS application, the drop-in video software app 100 can run on a computing device of the providing system 100 that resides on the cloud, such as back-end server 130. Further, in one or more embodiments, as a SaaS solution, the drop-in video software 110 may run a subscription-based model, where the cloud-based software may be provided on a subscription basis and users may pay a recurring fee to access the service. Due to having a SaaS architecture, the DIVaaS system 100 can have other characteristics that are often associated with cloud-based software models, including but not limited to: accessibility from anywhere with an Internet connection; no local installation requirement; scalability; automatic updates; shared infrastructure; and data backup and security. Alternatively, the drop-in video software 110 may be implemented as a Web-based software, on-demand software, hosted software, or software that is installed on the computer device 120B itself.

According to the embodiments, the drop-in video software 110 (depicted on computer device 120C) can render one or more graphical user interfaces (GUIs) implemented by the DIVaaS system 100. The GUIs allow the participants (users of the respective client devices 120A-120C) to access and interact with various features related to drop-in video session supported by the DIVaaS system 100. As further described herein, GUIs implemented by the DIVaaS system software 110 may be used to access and interact with drop-in video sessions, for example supporting two-way video collaboration where a first real-time video of a user on their tablet 120C can be distributed to other participating devices, such as computer devices 120A, 120B (participating in the same drop-in video session), while another real-time video of a user on their computer device 120A or 120B can be distributed to other participating devices, such as tablet 120C (participating in the same drop-in video session) to be viewed by the respective users. There may be one or more of an other real-time video sessions of a plurality of users participating in the same drop-in video session or one or more drop-in video sessions. In one or more embodiments, GUIs implemented by the DIVaaS system software 110 may be used to access and interact with drop-in video sessions, for example supporting two-way video collaboration where a real-time video stream of a user recording on their tablet 120C can be streamed/distributed to other participating devices, such as computer devices 120A, 120B (participating in the same drop-in video session), to be viewed by the respective users.

FIG. 1 also shows that the DIVaaS system 100 can include a server 130. Server 130 is shown as an example of one or more servers that may reside on the cloud to host software in a cloud-based software model and to provide the disclosed drop-in video features as a SaaS solution. The server 130 can be a back-end computer system(s) residing on the cloud that hosts the drop-in video functionality and features as implemented by the system 100. For example, the server 130 is configured to perform functions that can include but are not limited to: implementing open drop-in video session capabilities; implementing group drop-in video session capabilities; implementing exclusive drop-in video session capabilities; managing exclusive drop-in video session membership; Customer relationship (CRM) integration; and exclusive drop-in video enterprise routing. Also, data relating to drop-in video functions that are accessible to the server 130 can be stored in a datastore, shown as database 131. The database 131 may store and/or maintain pertinent data for later use with respect to other functions of the system 100, such as the data required for creating, managing, and controlling multiple drop-in video sessions.

The cloud-based architecture, for instance including server 130, allows a drop-in video session to be accessed and/or activated using several methods, including but not limited to: an Exclusive Hive may be embedded on a website and anyone globally can drop into the session 2) a Hive can be accessed through a personalized URL, which can be posted anywhere, such as on a social media site, and anyone globally can drop into the session and 3) a Hive is also available via the Hive owner's personal profile in SoHive, and anyone globally can drop into the session, and 4) when active, the Exclusive Hive is displayed as live on the SoHive Live Hive Stream, and anyone globally can drop into the session. The aforementioned functions (and any additional functionality) implemented via the cloud, for instance by server 130, are described in greater detail herein. An example configuration for the server 130 and its functions as a cloud-based resource are described in detail in reference to FIG. 2. Thus, for purposes of brevity, the specific functions of a cloud server are not described in detail for FIG. 1. Although FIG. 1 depicts a single server 130 on the cloud, this configuration is not intended to be limiting, and the DIVaaS system 100 can be implemented by several server computers and/or a cluster of server cloud-based computers.

A remote server on the cloud of the DIVaaS system 100, such as server 130, may be configured to implement key functions related to video conferencing and/or virtual meeting room technology, and thus hosts the drop-in video sessions for the system's 100 users. As an example, the server 130 runs various Application Programming Interfaces (APIs) that support video conferencing functions, such as a Node.js, Express.js, REST API, and the like, for building web and mobile applications and supporting networked services which ultimately creates the framework for executing drop-in video sessions. In other words, the cloud resources (e.g., sever 130) provides tools, functions, and processes needed to integrate and manage drop-in video session functionality within applications and features of the DIVaaS system 100.

In an embodiment, the system's 100 cloud resources (e.g., server 130) can host exclusive drop-in video sessions, where a person that is the owner/organizer (or host) of the drop-in video session can control and/or customize the access and use of a drop-in video session. In an embodiment, the owner/organizer of an exclusive drop-in video session can define two types of access to an Exclusive Hive—Scheduled or Drop-in Anytime. When an Exclusive Hive is set to Drop-in Anytime, the Hive is available, for anyone to join, 24 hours a day, 7 days a week, for 365 days a year, in short at all times.

In an embodiment, when an Exclusive Hive is scheduled, a Hive owner can customize a schedule that details when the session is live. For example, a user can specify up to five different one-time and/or recurring schedules for an exclusive drop-in video session. As a result, the server 130 (as part of the cloud) enables users to join an exclusive drop-in video session at allowable times in accordance with the set schedule. For instance, the owner/organizer of an exclusive drop-in video session can set a schedule for an exclusive drop-in video session to go live every Monday and Wednesday from 1:00 PM-4:00 PM (ET). Accordingly, the server 130 manages access to the exclusive drop-in video session based on the owner/organizer's defined controls and permits users to join the exclusive drop-in video session at those times, and alternatively can deny users from joining the session at times outside of the schedule. The system accounts for differences in users' time zones and presents the schedule in the time zone of each individual user, regardless of where they are located in the world. In the previous example, the server 130 will permit a user attempting to join the exclusive drop-in video session at 3 PM (ET) on a Wednesday (without having any knowledge of the identity of the user) to enter the session, since it is live (e.g., engaging participants) during this time. According to an embodiment, the cloud resources, such as server 130, generate a virtual address for an exclusive drop-in video session that does not change (e.g., the same virtual address can be used at different scheduled times), where it can continue as a recurring meeting until the scheduled session is deleted or inactivated.

In another embodiment, the owner/organizer of the exclusive drop-in video session can segment the allowed access to the session for a specified list of users (i.e., Membership). The owner of the Exclusive Hive can allocate one schedule of live hours to one membership list and a different schedule of live hours to a different membership list, thereby allowing the Hive owner to segment their customers per their business requirements. In one or more instances, the system's 100 exclusive drop-in video features can enable a user to charge for access to an exclusive drop-in session (e.g., subscriptions), office hours for academics, and the like. In one or more embodiments, system 100 may designate tier access to one or more exclusive drop-in sessions (e.g. tiered subscriptions) based on the payment level of membership access. In one or more embodiments the tiered subscriptions may include but not be limited to at least one of the following: platinum, gold, silver, premium, standard, basic, and the likeness thereof.

In the case of Membership, an exclusive drop-in video session with defined participants, the cloud resources (e.g., server 130) control access to the session based on the defined parameters from the owner/organizer. For example, users can register and create an account in the DIVaaS system 100, and an organizer can select which of registered users are allowed to join the particular drop-in video session. As a result, server 130 functioning on the cloud could have a list of registered users, but only select users may be authorized users (e.g., saved in the database 131) for a given exclusive drop-in video session. In operation, server 130 (or other cloud resource) has the capability to determine user authentication and access for an exclusive drop-in video session. For example, a user can attempt to access an exclusive drop-in session, by clicking a link on the organizer's webpage, thereafter the server 130 can determine whether the user is authorized (e.g., on the list of authorized users) before they are permitted to join the exclusive drop-in video session. Additionally, the system's 100 exclusive drop-in video features can be useful for certain use cases, such as enabling a user to charge for access to an exclusive drop-in session (e.g., subscriptions), office hours for academics, and the like.

Referring back to the previous example, resources on the cloud (e.g., server 130) can host the "football" group drop-in video session that the user of the tablet 120C is joining. That is, the cloud resources (e.g., server 130) created the virtual meeting room (or spaces) environment for the drop-in session, generated the unique URLs or identifiers for the drop-in video session, and manages joining and the participants of the drop-in video session. After the user of the tablet 120C selects the icon 112A (via the drop-in video software 110) to join the "football" group drop-in video session, a Hypertext Transfer Protocol Secure (HTTPS) link is created and establishes a connection to the cloud, for instance server 130. The server 130 can then manage the connection to let participants join the "football" group drop-in video session (e.g., corresponding to the URL). In some embodiments, cloud resources (e.g., server 130) create drop-in video sessions as continuous video chat rooms (after the session is activated), and thus provide a spontaneous drop-in collaboration experience where users can join a drop-in video session at any time (e.g., 24 hours a day).

In some embodiments, the cloud resources (e.g., server 130) currently allow up to 300 participants to join Open and Group Hives, and this maximum count may be expanded as utilization demands increase. An Exclusive Hive owner determines the number of Hive participants permitted, ranging from as few as one additional attendee, in addition to the host, up to 299 additional attendees. This count may be increased in the future as utilization demands increase.

In some embodiments, the DIVaaS system 100 realizes a solution in the realm of video-based communication technology by providing one-touch, spontaneous, two-way "drop-in" video sessions that can be accessed by users around the world, and without the limitations associated with having to be scheduled or prompted (e.g., invitation link) to enter a video session. The disclosed DIVaaS system 100 provides distinct drop-in video session capabilities which foster spontaneous inclusion and collaboration globally.

Figure 2:
FIG. 2 depicts an example configuration of a server that may be utilized by the DIVaaS system of FIG. 1, according to one or more embodiments shown and described herein.

FIG. 2 depicts an example configuration for the computing system 200 implementing various aspects of the drop-in video session functionality of the DIVaaS system. For example, the computing system 200 can be implemented as a cloud-based resource implementing SaaS solutions, such as a back-end server residing on the cloud of the DIVaaS system (shown FIG. 1). FIG. 2 illustrates computing system 200 being configured to include an application platform 201 providing a software environment that supports a set of tools, services, and frameworks for developing, deploying, and managing applications on the server infrastructure. In the example of FIG. 2, the application platform 201 supports several different modules, software-based tools and services, including but not limited to: Authentication Module 202; Meeting Module 203; Utility Module 204; Notification Module 205; User Module 206; API Module 207; Model Manager Module 208; Video Conference SDK Module 209; Database Module 210; Membership Module 212, Private Hive Module 214, Enterprise Routing Module 216, Scheduling Module 218, Social Module 220, Bad Actor Module 222, Contact Us Module 224, Hive Stream Module 226, and Shopping Cart Module 228.

The Authentication Module 202 implements authentication mechanisms to ensure that only authorized users can create a SoHive account and join drop-in video sessions (e.g., exclusive drop-in video session). For example, Authentication Module 202 provides various authentication related capabilities, which can include generating tokens or using other mechanisms to authenticate users. In one or more embodiments, a user may create a SoHive account and never join a Hive. In one or more embodiments, this user may be designated a non-active user. In one or more instances, a user may create a SoHive Account and an Exclusive Hive but never join anyone else's Hive. This user may be designated an Exclusive Hive owner.

Meeting Module 203 implements functions and endpoints to create virtual meeting rooms, spaces, or virtual environments for the drop-in video sessions. Meeting Module 203 can also provide the methods for participants to initiate new or join existing drop-in video sessions, and directly connect users to the sessions. Meeting Module 203 provides various meeting-related capabilities, which can include generating the unique URLs, access codes, or identifiers for the drop-in video sessions. The virtual meetings support standard video session capabilities, such as chat, start/stop video, start/top audio, identify participants, share screen/content, invite one or more other people, change background, and raise/lower hand.

Utility Module 204 implements the utility functions to facilitate operation of the drop-in video sessions. The Utility Module 204 provides utility related capabilities, which can include implementing video integration, and enabling chat and messaging features among participants during the drop-in video sessions.

The Notification Module 205 implements real-time notifications or webhooks to inform users about relevant events regarding the drop-in video sessions, such as joining Exclusive Hives, and for social updates. For example, the owner of an Exclusive Hive is notified whenever a participant activates and joins a Hive owner's Exclusive Hive. Users are also notified when any participant joins the Hive one is already participating in. Users will also receive notifications whenever another user Follows or Unfollows them. Similarly, a user will trigger a notification to another user whenever they Follow them or Unfollow them. Users will also receive notifications for Membership, Private Hive, Enterprise Routing and Bad Actor Reporting features. In one or more embodiments, the notifications for Membership, Private Hive, Enterprise Routing and Bad Actor Reporting features may be delivered from the Membership Module 212, Private Hive Module 214, Enterprise Routing Module 216, and Bad Actor Module 222. In one or more embodiments one or more additional modules may be utilized to send one or more additional notifications.

User Module 206 implements maintaining and managing users of the DIVaaS system (e.g., registration), including adding, editing, archiving and deleting user accounts. It also tracks the history of Hive usage per user, displaying the most recent five Hives visited, regardless of if they were Open, Group or Exclusive Hives. The User Module also tracks a user's required demographic information, including name and email, as well as the optional demographic information such as email, short bio, phone number, city, country, with additional fields, such as language(s), to be added in the future. The User Module also supports a user specifying up to three website URLs, and two or more popular social website links.

The APIs Module 207 can be the various APIs that provide the tools, functions, and processes that integrate drop-in video session functionality within the applications and features of the DIVaaS system. For example, the APIs Module 207 can include APIs that are provided by Node.js, Express.js, such as the Representational State Transfer (REST) API and supports functionality necessary for implementing drop-in video sessions. APIs are and will be used for integration to other external systems, including third party scheduling software, shopping cart software, marketing management software, etc.

The video conference Software Development Kit (SDK) Module 209 implements the tools, libraries, and documentation that provide the video conferencing and real-time video and audio communication capabilities to be integrated into the applications and features of the DIVaaS system. The video conference SDK Module 209 provides extensive video conferencing-related capabilities, which can include implementing, for all meeting attendees, two-way video and audio, and screen sharing functionalities necessary for drop-in video sessions, as well as chat, and integrating whichever third party tools or games are deemed helpful to Hive users and Exclusive Hive owners The Databases Module 210 implements the tools, operations, and functionality for interacting with a database and other storage systems. The Databases Module 210 provides various database related capabilities, which can include storing, retrieving, updating and deleting data in databases. In an embodiment, the Databases Module 210 is currently configured to utilize MongoDB.

In an embodiment, the Server Module 200 is configured to operate as a part of a cloud computing model, for instance implementing SaaS capabilities. For example, the Server Module 200 operates with Amazon Web Services (AWS) and thus the DIVaaS system (shown in FIG. 1) can utilize a wide range of cloud services, including computing power, storage, memory, databases, networking, analytics, machine learning, natural language processing, and extensive other technologies, in order to implement the drop-in video session capabilities described herein as a SaaS solution.

Bad Actor Module 222

In one or more embodiments, SoHive may conform to the Apple and Google Bad Actor requirements. In one or more instances, attendees in a Hive may 'vote' someone out of the Hive via the Bad Actor feature, which is a check box that appear in every attendee's tile. If an attendee is selected as a Bad Actor by 5 or more attendees, that attendee is automatically logged out of that Hive and the app SoHive and blocked from using SoHive for 24 hours. If this occurs a second and third time, that user is permanently blocked from using SoHive or any of SoHive's Hives.

Social Module 220

In one or more embodiments, SoHive may enable social business by offering the social elements of Follow and Following. SoHive provides each user with the ability to see a list of Followed users and those users Following them, with essay access to their profile pages and, if applicable, their Exclusive Hives. SoHive users can follow Exclusive Hive owners to keep track of their activity and Hive schedules.

Hive Stream Module 226

In one or more embodiments, SoHive may provide via the main landing page, for any user in the world, the SoHive Exclusive Hive Live stream. This list any Exclusive Hive live anywhere in the world, and enables any SoHive user to join that Hive the Hive has additional capacity for more attendees.

In one or more embodiments, SoHive may provide a Hive History stream, which shows each of the Hives that was live, but is no longer live.

In one or more embodiments, selecting a Hive description of an Exclusive Hive, in either the Hive Live or Hive History tabs, will take the user to the Exclusive Hive owner's profile page, so the user can see the schedule for that Hive's upcoming drop-in hours.

Scheduling Module 218

In one or more embodiments, SoHive may provide each Exclusive Hive owner has complete control over their schedule in their Hive. They have two main scheduling options:

Drop-in Anytime
This option enables users to drop into an Exclusive Hive 24 hours a day, 7 days a week, 365 days a year (24×7×365). This option offers a virtual room that is 100% available at all times.

Scheduled
This option offers complete flexibility in scheduling Live Office hours, including specifying time zone, day, from and to hours, and all recurring options such as daily, weekly, monthly, as well as specifying particular days and cadences. Up to five different scheduled series and/or individual appointments may be defined for one Exclusive Hive and one time. The next five appointments across all series will appear in the Exclusive Hive's tile when it is displayed in the Hive Live stream and the owner's profile page.

Private Hive Module 214

In one or more embodiments, SoHive may enable an Exclusive Hive owner to set their Hive to Private. When a Hive is set to Private, the Hive will not appear in the Hive Live nor Hive History live streams. The Hive will also be hidden to users when they visit the profile screen of the Exclusive Hive owner. The only way for a user to join a Private Hive is if it is embedded on the owner's website or if the user exclusively uses the URL feature, in which they invite specific people directly to their Hive via the URL.

Membership Module 212

In one or more embodiments, SoHive may provide one or more Exclusive Hive owners need to lock down Hive attendees to specific membership groups. SoHive enables an Exclusive Hive owner to define the participants who may join a particular Hive schedule. A Hive permits up to 5 scheduled series, so up to 5 different memberships may be defined by the Exclusive Hive owner. For example, a business that teaches public speaking may have one series of meetings to teach business foreigners public speaking skills to do business in the USA, a second series to teach entrepreneurs how to present a compelling pitch, and a third series to help priests give engaging sermons.

CRM Integration

In one or more embodiments, SoHive may tracks users in a SoHive Exclusive Hive via their username and email address. Using CRM integration, SoHive is able to send new user information to the Exclusive Hive owner's CRM, thereby acting as a new intake funnel for new business opportunities.

Additionally, Exclusive Hives will enable Hive owners to access the business' CRM to enable rapid population of membership rosters, thereby saving time and increasing membership roster accuracy.

Enterprise Routing Module 216

In one or more embodiments, SoHive may provide an Enterprising Routing Module. For example, imagine going to a car dealer's website, selecting the car dealer's Exclusive Hive and dropping into a two-way video, directly speaking to the salesperson on the car dealer sales floor. If the Live Office Hours are over, instead SoHive's Enterprise Routing will route the shopper to the next available car dealer that has SoHive Live Office hours and can demonstrate the same car and its features. This will provide a brand new way of purchasing, leveraging all the value of the vendors' websites, for national or global organizations who have brick-and-mortar stores.

Administrator Module

In one or more embodiments, SoHive may provide an Administrator Module brings transparency to the SoHive staff of all SoHive users, which users have Exclusive Hives their associated features. Through the Administrator Module, SoHive staff will be able to monitor churn, growth, add-on services, and global reach.

Contact Us Module 224

In one or more embodiments, SoHive may provide an Exclusive Hive may be available in the Contact Us page of the website and app, for users to drop in and speak to SoHive staff for immediate engagement. Additional feedback options are available through phone number and email. In one or more embodiments, other modes of communication may be available for Shopping Cart Module 228

In one or more embodiments, the Shopping Cart Module may be adapted for one or more users to buy Hive, subscribe to DIVaaS, purchase membership(s), and other retail purchases.

SoHive will offer two levels of Shopping Carts in the Shopping Cart Module.

1) Buy an Exclusive Hive

This module will enable a SoHive user to purchase their own Exclusive Hive directly from SoHive, including defining their own Hive attributes, such as schedule and number of permitted users, 2) Exclusive Hive eCommerce The Exclusive Hive eCommerce Module will enable SoHive Exclusive Hive owners to embed shopping features within the Exclusive Hive, thereby making it possible for the Exclusive Hive owner to earn money from every purchase initiated from their Exclusive Hive.

The Shopping Cart Module is the primary mechanism by which SoHive will become revenue-producing. SoHive revenue will consist of Hive subscriptions, as well as up-charges for Membership, Private Hives, and Enterprise Routing. It will also include up-charges for tiered video-usage fees. Finally, SoHive will take a small portion of every eCommerce sale.

Figure 3:
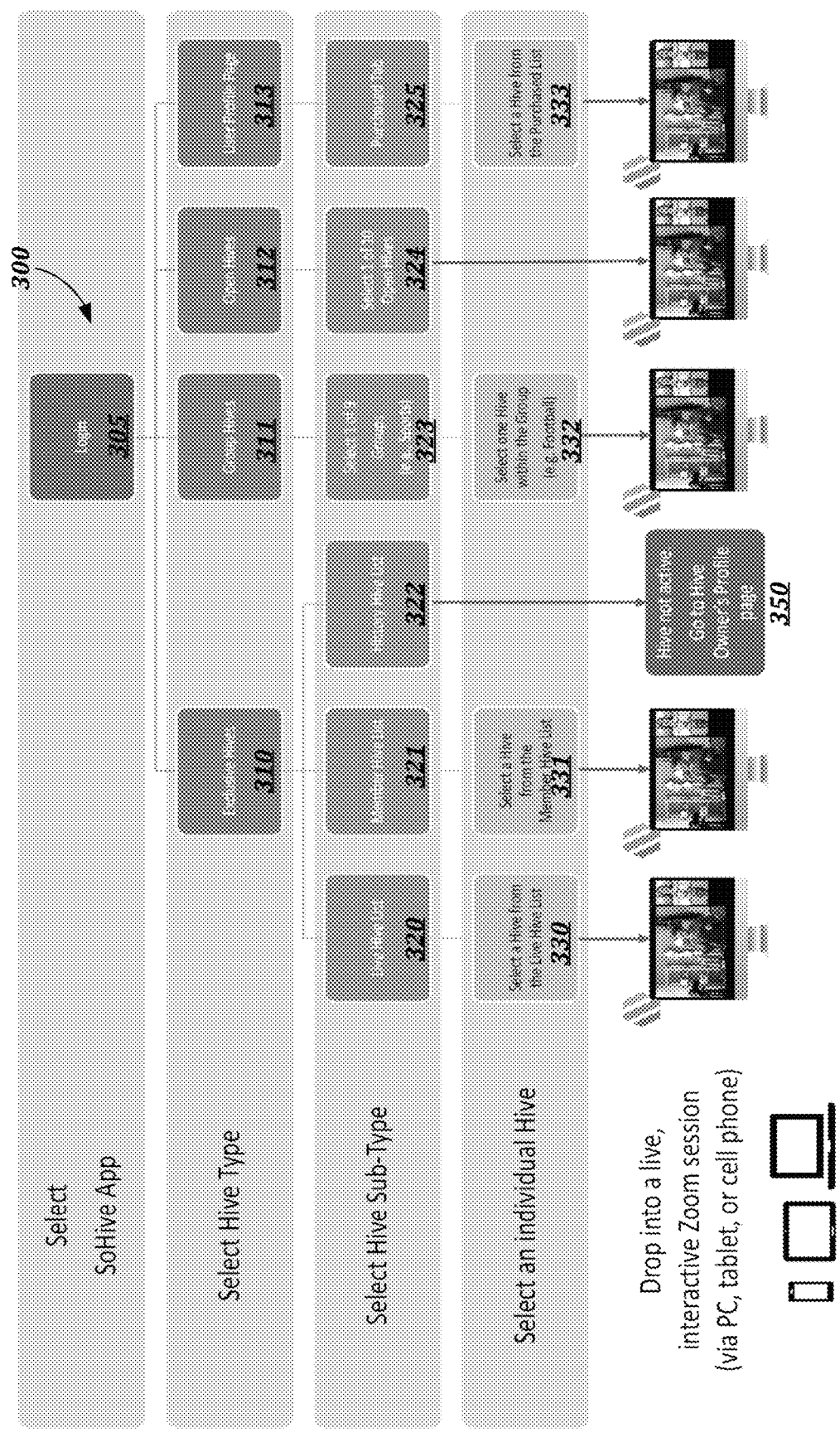
FIG. 3 is a flow diagram of an example method for interacting with the DIVaaS system of FIG. 1, according to one or more embodiments shown and described herein.

SoHive Application User Workflow. FIG. 3 illustrates an example workflow of a method 300 for interacting with the DIVaaS system (shown in FIG. 1), which ultimately allows a user to spontaneously enter a drop-in video session from within the SoHive application. In particular, the method 300 involves interacting with the system via the drop-in video software, which can be accessed on the cloud as a SaaS solution on the computer device of a user, such as a smartphone, PC, or tablet computer. Login: the method 300 begins with a user selecting the drop-in video software, which involves performing a user login into the system at operation 305. For example, a user can access the drop-in video software hosted on the cloud (e.g., using a web browser) from their computer device, such as a smartphone. In response, the drop-in video software can generate GUIs which enable the user to then log-in to the DIVaaS system. Register: If the user is unregistered, they must create a User Account. If the user is already registered, the user must get authorized to log in. and subsequently has access to the various features that are supported by the system.

Select Hive: Thereafter, the user can select a type of drop-in video session that is desired. The method 300 includes several options, where the user can select an exclusive drop-in video session at operation 310, select a group drop-in video session at operation 311, select an open drop-in video session at operation 312, or select an Exclusive Hive directly from a User Profile page at operation 313. For instance, the user can participate in the selected live drop-in video session, interacting with users in a two-way video chat session on their computer device, such as a PC, tablet, or smartphone. Users can join one of these Hives, leave that Hive, and then join a different Hive, whenever they choose. A user can move between Exclusive Hives, Group Hives and Open Hives seamlessly. A user can only be in one active Hive at a time.

Exclusive Hives 310: The user may drop into an exclusive drop-in video session directly from the Live Hive Stream (i.e., operation 320) or the Member Hive stream if they are a Member of that Hive (i.e., operation 321). If the user chooses an Exclusive Hive from the Hive History list (i.e., operation 322), then, since the Exclusive Hive is not active, the user will be taken to the User Profile page of that Exclusive Hive's owner instead.

Group Hives 311: In response to the user selecting the Group Hives tab, a menu of nine different Groups appears. Once the user selects one Group, such as in operation 323, the user is presented with a number of Hives within that Group with related sub-topics. For example, the Group 'Sports' has several Hives such as Football, Soccer, and Baseball, which are all sub-topics that relate to the Group 'Sports'. If the user selects the sub-topic of "Football" from the available sub-topics in the Group 'Sports', than the user will "drop-in" to the "Football" video chat, and interactively participate in the Group drop-in video session to discuss football with the other participants. In an embodiment, the DIVaaS system currently supports up to nine different Groups, where each Group (i.e., topic) has two or more Hives that correspond to a respective sub-topic related to that Group. Examples of Group topics, and their related sub-topic Hives include, but are not limited to: Sports (e.g., Football, Soccer, Basketball, Fishing, etc.); Entrepreneurship (e.g., Start-ups, Taxes, Marketing, etc.); Travel (Virtual Tours, Photography, etc.); Animals (e.g., Pets, Safari, Birding, etc.); Music (e.g., Karaoke, Jam Sessions, Favorite Artists, etc.); Food/Drinks (e.g., Cooking, Baking, Cocktails, etc.); Education (e.g., Study Buddy, Tutor, etc.); Home Improvement (DIY, Plumbing, Electric, etc.); and Movies (Watch Party, Reviews, etc.).

Open Hives 312: In response to the user selecting the Open Hives tab, a menu of ten different Open Hives appears. In operation 324, in response to the user selecting one of the ten open drop-in video session, the user drops instantly into that specific Open Hive. The DIVaaS system can support multiple individual open drop-in video sessions simultaneously, up to a maximum number. For instance, the DIVaaS system can currently host up to ten different open drop-in video sessions for different users to enter spontaneously.

User Profile 313: For any User (A) who has purchased an Exclusive Hive, accessing that Exclusive Hives can be done by any other user (B) from that User's (A) Profile Page. When a user (B) searches for and selects a User (A) who owns an Exclusive Hive, and goes to that User's (A) Profile page, such as in operation 313, the user (B) is presented with two tabs, Purchased and Member. If the user (B) selects the Purchased tab (i.e., 325), and an Exclusive Hive tile appears, selecting the hexagon in the tile will drop the user (B) instantly into that Exclusive Hive belonging to the User (A) of the profile page. For example, a user (A) may create a registered account with the DIVaaS system and purchase multiple subscriptions for multiple drop-in video sessions. Any user (B) will be able to access these drop-in video sessions via this user's (A) Profile Page. Continuing with the previous example, the user can have previously purchased subscriptions to access different drop-in video sessions that are individually owned/organized by different celebrities, including an athlete, a singer, and a movie actor. In operation 333, the user can select to specifically "drop-in" to the drop-in video session that is owned/operated by the singer, and interactively participate in their purchased drop-in video session to discuss an upcoming concert, for example.

History Hive Stream: The History Hive tab is the DIVaaS system's historical archive of drop-in video sessions that are no longer active. Thus, in response to the user selecting the History Hive tab, in operation 322, the user sees a list of all Hives that were previously active, sorted with the Hives that ended most recently first. Since those Hives are no longer active, users will be unable to enter those Hives. However, selecting the tile will take the user to that Exclusive Hive owners Profile Page (i.e., operation 350) where the user will be able to see the Hive schedule, including when that Hive will be active next.

Hive Features: Consequently, the method 300 implements a distinct process for employing one-touch, unprompted, spontaneous, two-way drop-in video sessions, as disclosed herein, that can be accessed by users around the world, and without the limitations associated with having to be scheduled or prompted (e.g., invitation link) to enter a video chat, in a manner that supports spontaneous inclusion and collaboration globally.

Figure 4:
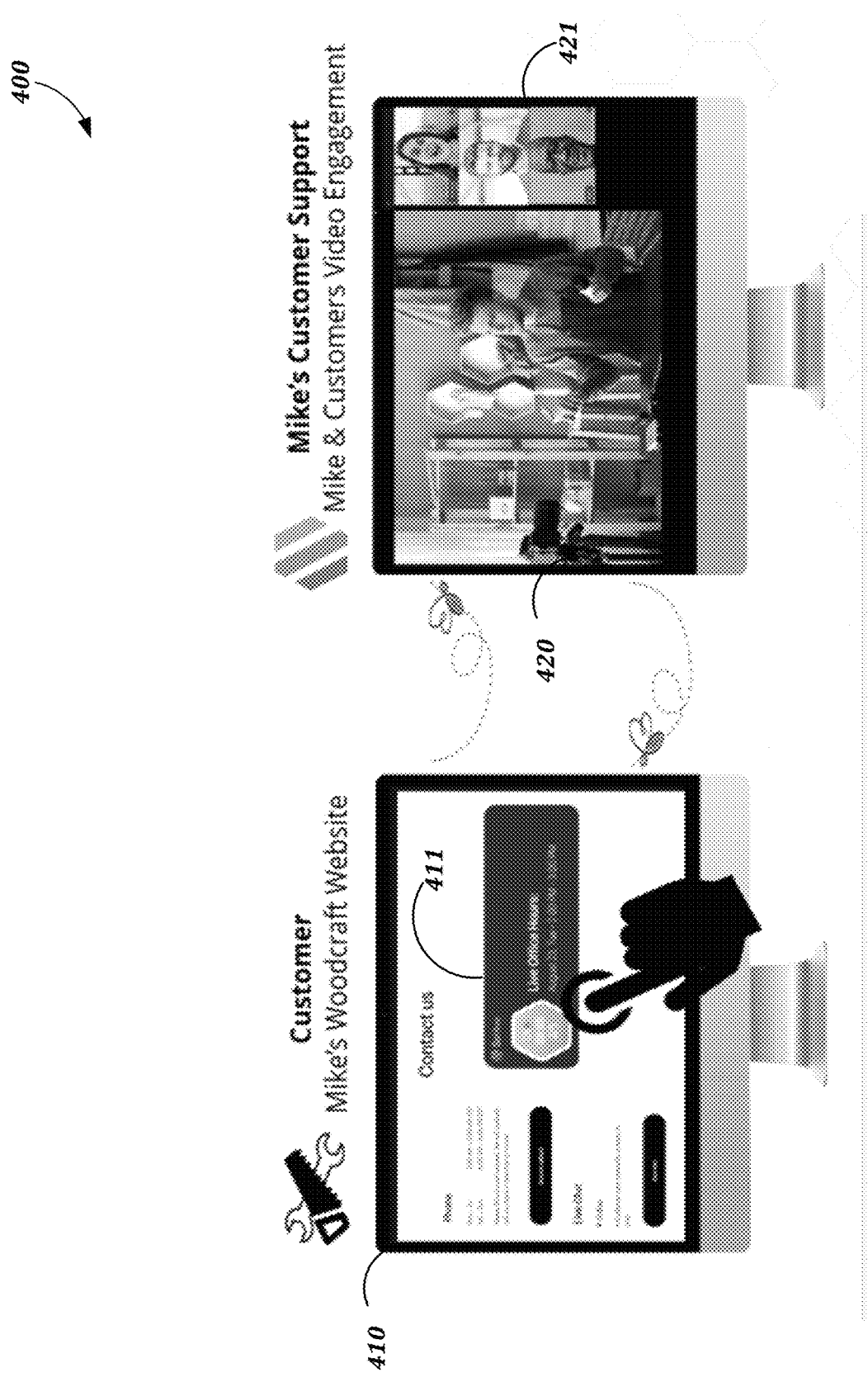
FIG. 4 depicts an example application of the DIVaaS system of FIG. 1, according to one or more embodiments shown and described herein.

Exclusive Hive Embed Code: FIG. 4 depicts an example of an operational environment 400 that illustrates the use of exclusive drop-in video sessions distributed to business websites, as implemented by the DIVaaS system (shown in FIG. 1). In the example of FIG. 4, a website of a business is displayed on a computer device 410. For example, the computer device 410 is a computer being employed by the business owner. The business is shown as "Mike's Woodcraft," and the business/business owner can be a registered user of the DIVaaS system (e.g., DIVaaS customer). By adding SoHive embed code directly onto their business website, the business can offer the DIVaaS system and its capabilities. To that end, as seen in FIG. 4, the business website (Mike's Woodcraft Website) can also display an icon 411 that allows visitors to their business website to access their exclusive drop-in video sessions through a single click. Mike's Woodcraft business can host their own exclusive drop-in video sessions via this icon, enabled through the embed code. In FIG. 4, the icon 411 particularly corresponds to a "Live Office Hours" exclusive drop-in video session, which is either available perpetually, or scheduled for specific day(s)/time(s), for example, "recurring beginning Tuesdays, August 23, from 2-3 PM."

Activating Exclusive Hive Embed Code: Additionally, FIG. 4 depicts another computer device 420 which displays the exclusive drop-in video session 421 that is initiated when a participant (e.g., business customer) accesses the session hosted by the Mike's Woodcraft business. For example, a user of computer device 420 can be a customer of Mike's Woodcraft, and thusly visits their business website (as shown on computer device 410). While viewing Mike's Woodcraft website, the user of computer device 420 can select the displayed icon 411 which launches the exclusive drop-in video session hosted by Mike's Woodcraft on their own PC. Once the exclusive drop-in video session 421 has been entered, the user's computer device 420 renders the virtual meeting room environment presenting streaming video/audio of a Mike's Woodcraft employee (e.g., leading a woodcraft workshop) and other participants. After the customer leaves the exclusive drop-in video session 421, they are returned to Mike's Woodcraft business website, in a manner that allows the DIVaaS system to operate in the background (e.g., not being directly seen by the customers of Mike's Woodcraft business). In other words, an application of the DIVaaS system allows a business to host drop-in video sessions that are directly accessible to their customers via their own business website, where the business' customers have simple, "one click" access to the business' exclusive drop-in video sessions directly from the business website.

Figure 5:
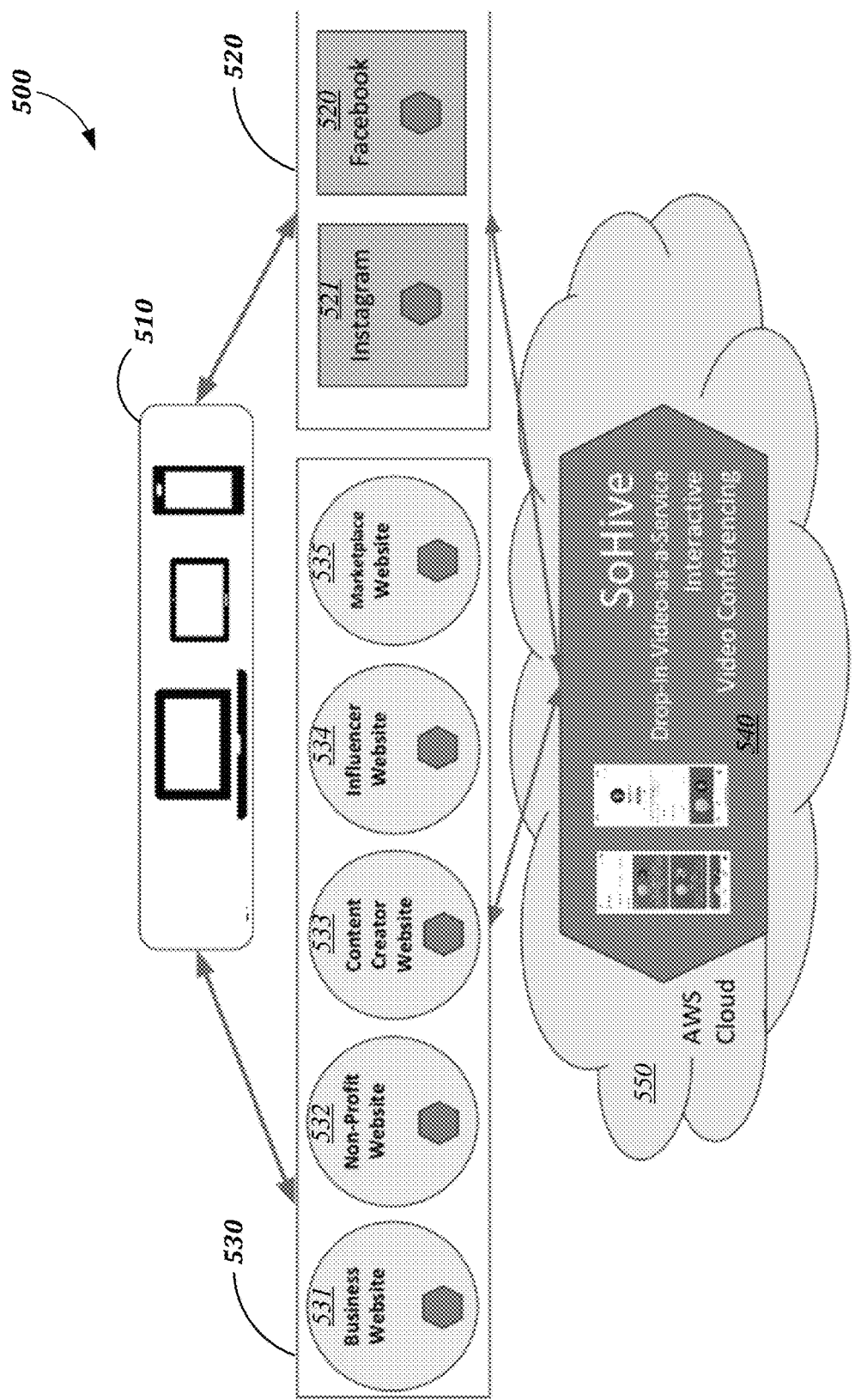
FIG. 5 depicts an example computing environment implementing the DIVaaS system of FIG. 1, according to one or more embodiments shown and described herein.

SoHive Computing Environment: FIG. 5 depicts an example computing environment 500 implementing the DIVaaS system of FIG. 1. In FIG. 5, the SaaS cloud-based architecture of DIVaaS system is illustrated. That is, the DIVaaS software 540 applications and features can be supported on the AWS cloud 550, and then provided to customers employing their computing devices 510 (e.g., over the Internet). As an example, the capability to host and/or access drop-in video sessions provided by the DIVaaS software 540 is distributed to customers from the AWS cloud 550 as a service, for instance on a subscription basis. Further, FIG. 5 shows that the DIVaaS software 540 and features can be accessible to users through the web, having access points (e.g., clickable icons for drop-in video sessions) that are integrated on social media websites 520 or business/organization websites 530.

Figure 6:
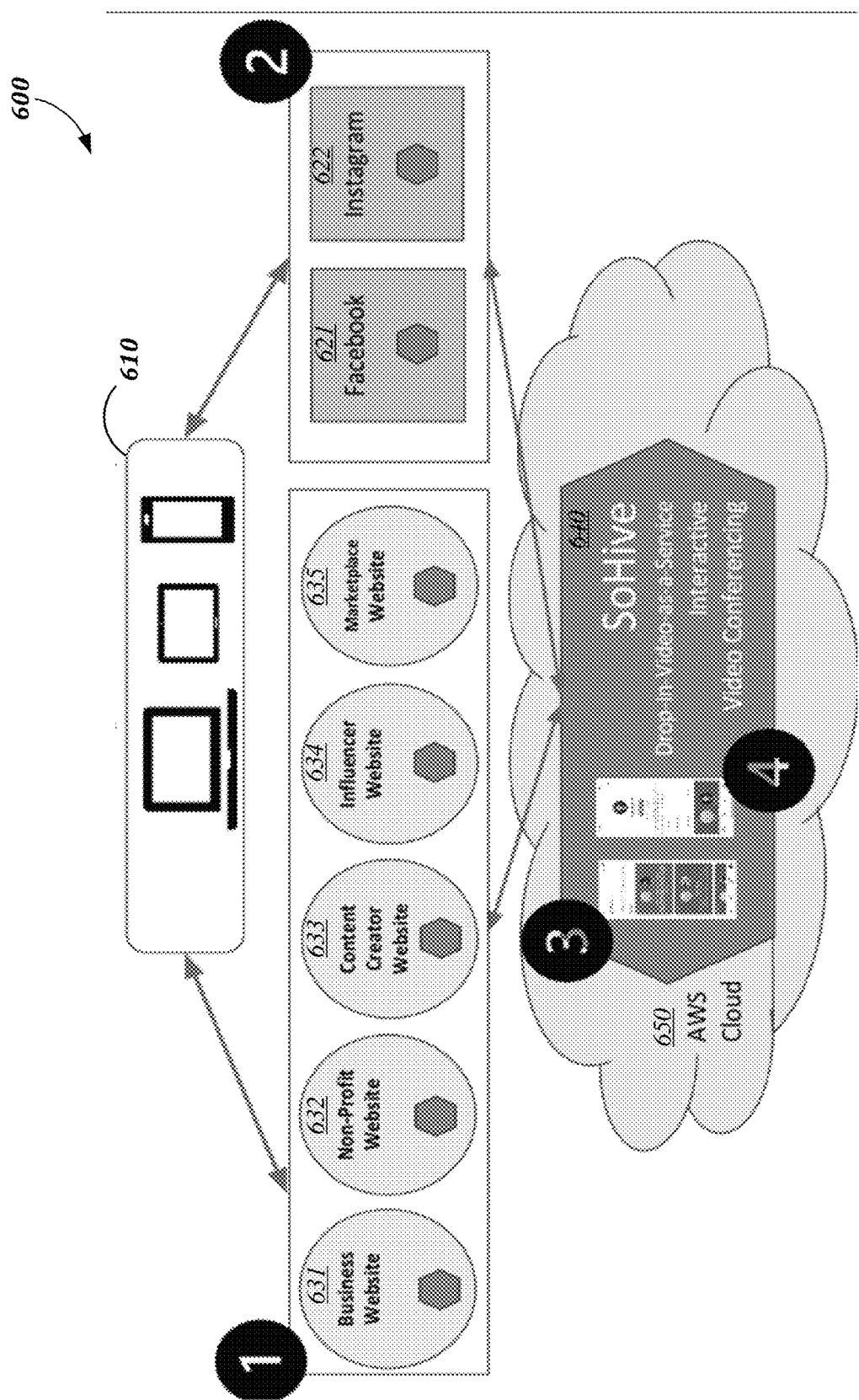
FIG. 6 depicts examples of accessing drop-in, live, interactive video sessions in the computing environment of FIG. 5, according to one or more embodiments shown and described herein.

FIG. 6 depicts examples of mechanisms for accessing drop-in video sessions in the computing environment 600 (also shown in FIG. 5).). In the example, a computing device 610 associated with a customer can utilize various mechanisms to access drop-in video sessions and other interactive video conferencing features supported by DIVaaS software 640 (residing on the AWS cloud 650) and provided via a cloud-based computing model. For example, a user of a computing device 610 can access a drop-in video session by clicking a corresponding icon that is displayed on a website. The website can be associated with a business/organization that is a customer of DIVaaS system 640, and thus is allowed to provide access to a drop-in video session that they are hosting on their personally owned and operated website. As seen in FIG. 6, a computing device 610 of a user can access the interactive features supported by DIVaaS software 640 (on the AWS cloud 650) via a business website 621, non-profit website 622, content creator website 623, influencer website 624, and marketplace website 625. Additionally, FIG. 6 illustrates that a user can employ their computer device 610 to enter a drop-in video session where access is provided via various social media websites (or apps), such as Instagram 621 and Facebook 622. For instance, a customer of the DIVaaS system who is a football coach at a local high school can display a clickable icon that provides access to their hosted drop-in video session about their football team on their personal Facebook page. Thus, any user who wants to join the coach's drop-in video sessions would merely need to go to their social media account to gain access.

Figure 7:
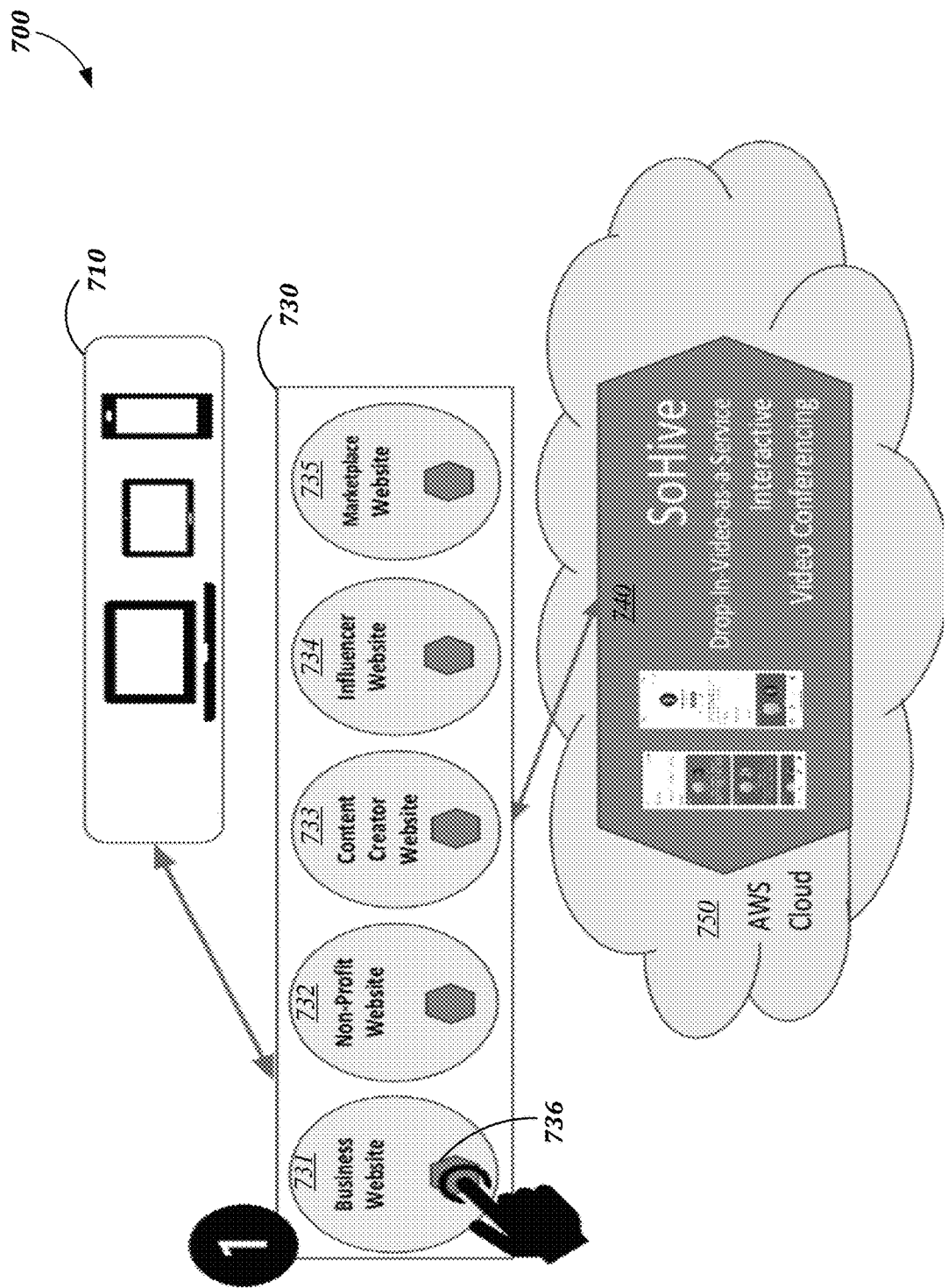
FIG. 7 depicts an example computing environment implementing an embed feature of the DIVaaS system of FIG. 1, according to one or more embodiments shown and described herein.

Hive Access via Embed: FIG. 7 depicts an example computing environment 700 implementing an embed feature provided by the DIVaaS system of FIG. 1. Moreover, FIG. 7 Embed enables a business to add drop-in, live, interactive video directly on their own website, according to one or more embodiments shown and described herein. As previously described, the DIVaaS system allows its customers to have the ability to host drop-in video sessions (and other interactive video conferencing features) that are accessible via their own business/organization websites. Particularly, a customer of the DIVaaS system can embed the code for an interactive access mechanism, such as clickable icon 736, within their business/organization website. In other words, an interactive mechanism for entering a drop-in video session, namely icon 736, is visible and interactively accessible for users directly from the business' website. FIG. 7 shows a user clicking the icon 736 displayed on a business website 731 (e.g., code implementing clickable access to the drop-in video host session embedded in website), which would allow them instant access to a corresponding drop-in video session that is hosted by that particular business.

Figure 8:
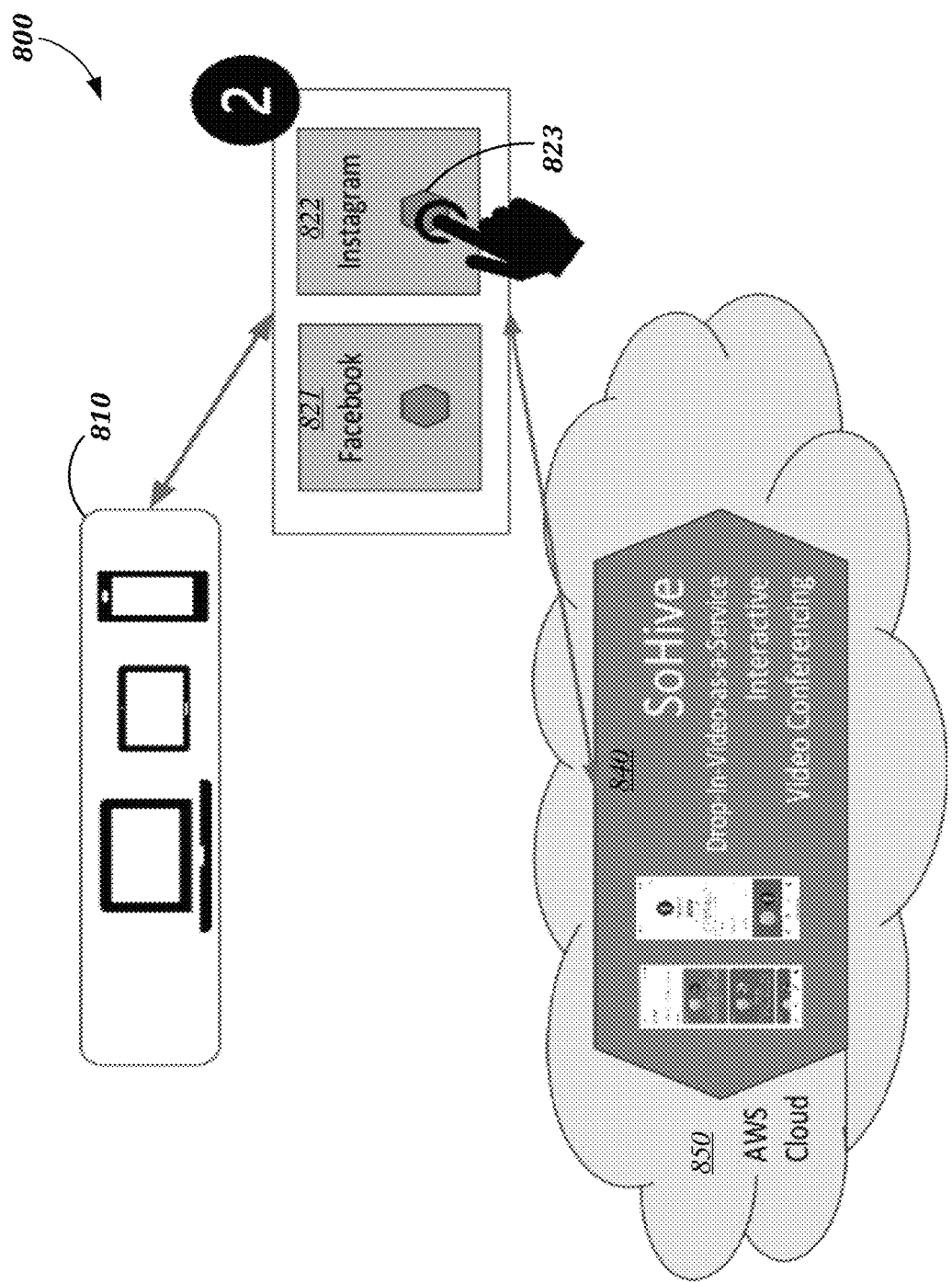
FIG. 8 depicts an example computing environment implementing a uniform resource location (URL) feature of the DIVaaS system of FIG. 1, according to one or more embodiments shown and described herein.

Hive Access via URL: FIG. 8 depicts an example computing environment implementing a uniform resource locator (URL) feature of the DIVaaS system of FIG. 1, which allows a business to add a URL to their Facebook or Instagram or other social media page, enabling drop-in, interactive video directly from their social media site, according to one or more embodiments shown and described herein. More specifically, FIG. 8 depicts an example computing environment 800 implementing a uniform resource location (URL) feature that is supported by the DIVaaS system of FIG. 1. The DIVaaS system enables its customers to host drop-in video sessions (and other interactive video conferencing features) that are accessible via social media websites (e.g., websites not operated by the particular business/organization). In the example of FIG. 8, a customer of the DIVaaS system has included a URL, shown as clickable link 823, that provides access to their drop-in video session within Instagram 822. Therefore, a user can join a drop-in video session hosted by an individual directly from social media, like Instagram 822, simply by clicking the URL 823 displayed on their Instagram profile. It should be appreciated that FIG. 8 depicts Facebook 821 and Instagram 822 as examples of social media websites for illustrative purposes, and it is not intended to limit the capabilities of the disclosed system with respect to other forms of social media not described herein. Note, the URL can also be used independently of the social media sites. The business owner can email, text or otherwise share the URL link directly to anyone, anywhere, at any time to provide instant access to an exclusive video session.

Figure 9:
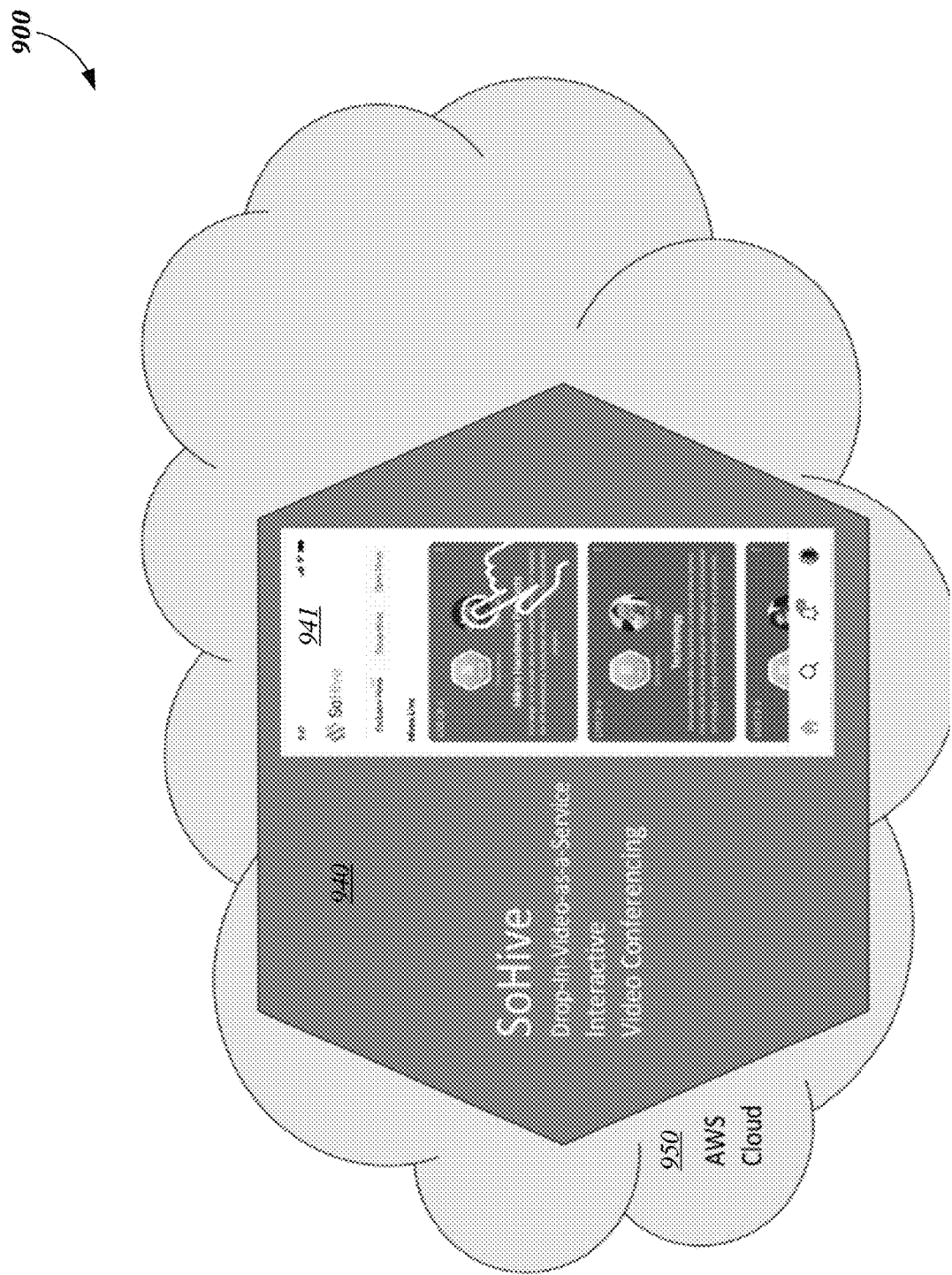
FIG. 9 depicts an example computing environment implementing a live stream feature of the DIVaaS system of FIG. 1, according to one or more embodiments shown and described herein.

Hive access via Hive Live Stream: FIG. 9 depicts an example computing environment implementing a Live Hive stream feature of the DIVaaS system of FIG. 1, in which anyone can join a Live Hive from anywhere in the world, according to one or more embodiments shown and described herein. Moreover, FIG. 9 depicts an example computing environment 900 implementing a stream of live video sessions that are two-way interactive, not just one-way, as a feature of the DIVaaS system of FIG. 1. FIG. 9 illustrates a Hive Live stream capability of the DIVaaS software 940. In the example of FIG. 9, the DIVaaS software 940 provides a GUI 941 which displays the list of exclusive drop-in video sessions that are currently actively in use and are therefore "live" streamed by the system. Subsequently, any global user can select and join any one of the listed "live" drop-in video sessions directly from the Live Hive stream provided by the DIVaaS software 940. In some cases, a "live" drop-in video session already has several users that are currently participating in the interactive video session, and thus a newly joining user of a "live" drop-in video session has a higher likelihood of entering a session that is engaging and includes a substantive group of people. If the number of users in a specific Hive listed equals the maximum number of users allowed in the Hive at one time, any additional users will receive a warning message that the Hive is full, and they must wait until someone leaves the Hive before they can join.

Figure 10:
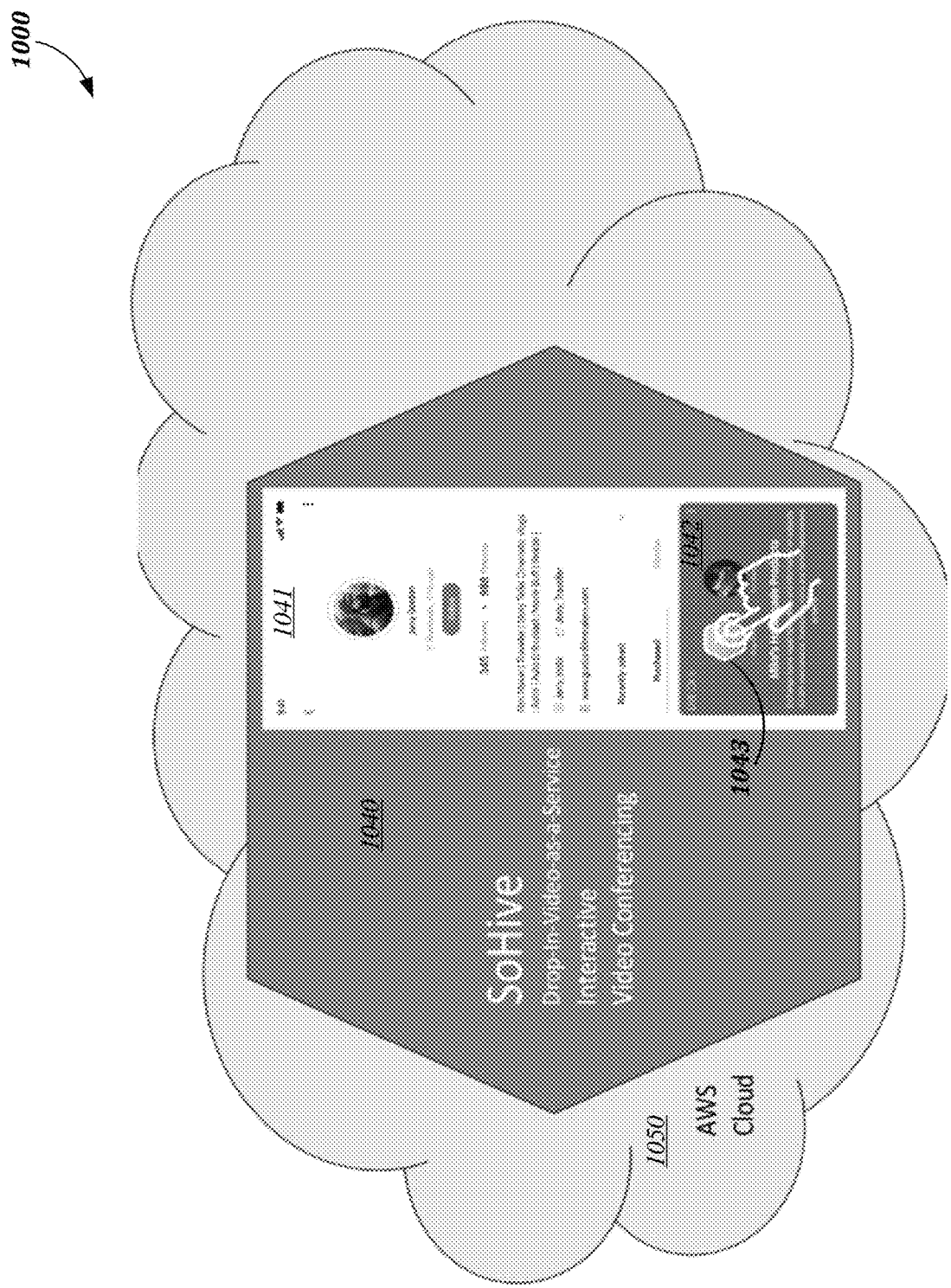
FIG. 10 depicts an example computing environment implementing a profile feature of the DIVaaS system of FIG. 1, according to one or more embodiments shown and described herein.

Hive access via Profile Page: FIG. 10 depicts an example computing environment implementing a profile feature of the DIVaaS system of FIG. 1, in which anyone, anywhere in the world, can join a Hive Owner's Hive directly from the Hive owner's profile page, according to one or more embodiments shown and described herein. Moreover, FIG. 10 depicts an example computing environment 1000 implementing a User Profile feature provided by the DIVaaS system of FIG. 1, FIG. 10 illustrates a SoHive user's Profile Page 1041, shown as the profile for a user "Jerry Gordon." For instance, a user can search for "Jerry Gordon" in the SoHive application, select Jerry Gordon from the list and open the SoHive Profile Page for Jerry Gordon on their smartphone, tablet or laptop in order to view the "Jerry Gordon" profile page 1041. Additionally, FIG. 10 shows that the SoHive Profile Page 1041 displays a drop-in video session 1042 that the page's owner (e.g., Jerry Gordon) has subscribed to (e.g., purchased) and is available to live stream by the system. Subsequently, when the customer, namely Jerry Gordon, opens their SoHive Profile Page 1042, they are able to see whether the "Mike Handmade Products" drop-in video session that they have purchased is currently live or not. Any SoHive user can click on the displayed icon 1043 to access that drop-in video session 1042 directly from the SoHive Profile Page 1041 without having to leave SoHive.

Figure 11:
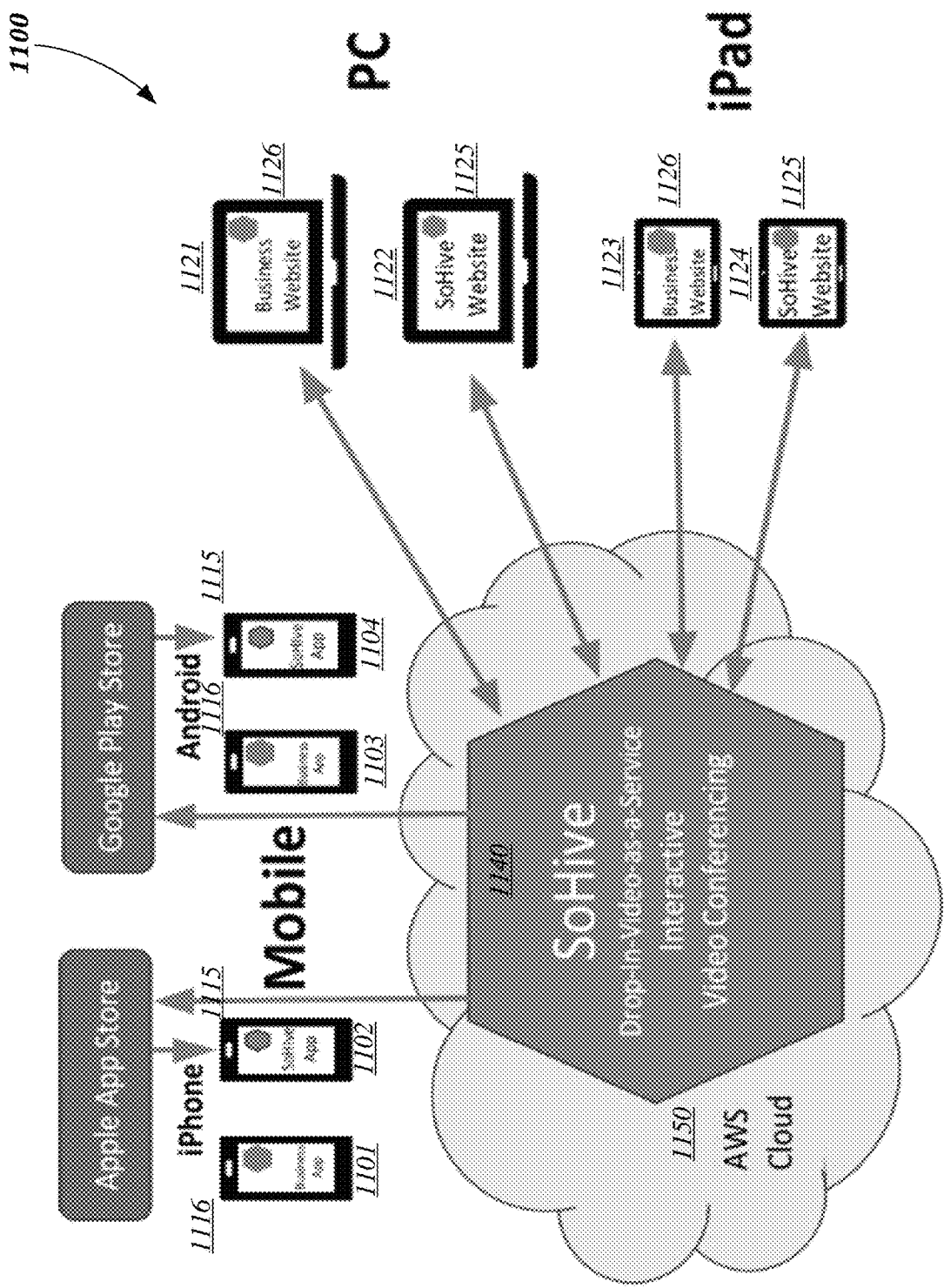
FIG. 11 depicts an example of device accessibility for the DIVaaS system of FIG. 1, according to one or more embodiments shown and described herein.

Device Accessibility: FIG. 11 depicts an example of computing environment 1100 implementing a device accessibility feature of the DIVaaS system of FIG. 1. FIG. 11 illustrates that the DIVaaS software 1140 and features are accessible from the AWS cloud 1150, and are distributed as a SaaS solution. In particular, FIG. 11 shows that DIVaaS software 1140 is accessible to mobile devices 1101-1104, shown smartphones, via DIVaaS apps 1115 and business apps 1116; and that the DIVaaS software 1140 is accessible to computing devices 1121-1124, shown as personal computers (1121, 1122) and tablet computers (1123, 1124), via DIVaaS websites 1125 and business websites 1226.

Figure 12:
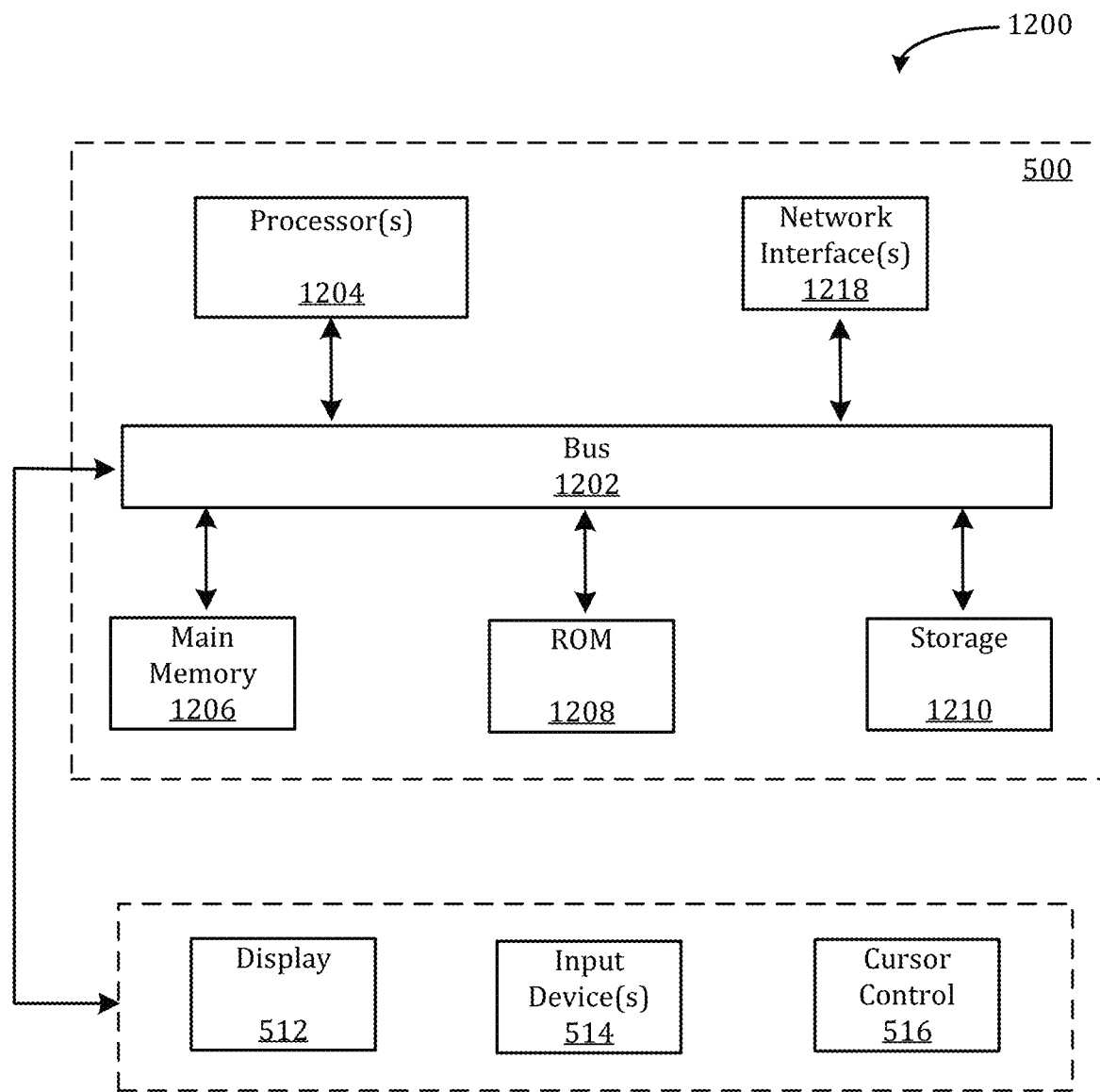
FIG. 12 depicts an example of a computer system that may be used in implementing the DIVaaS system, according to one or more embodiments shown and described herein.

FIG. 12 depicts a block diagram of an example computer system 1200 in which the disclosed aspects of the DIVaaS system and drop-in video sessions features may be implemented. Furthermore, it should be appreciated that although the various instructions are illustrated as being co-located within a single processing unit, there may be some implementations in which processor(s) includes multiple processing units, allowing one or more instructions may be executed remotely from the other instructions.

The computer system 1200 includes a bus 1202 or other communication mechanism for communicating information, one or more hardware processors 1204 coupled with bus 1202 for processing information. Hardware processor(s) 1204 may be, for example, one or more general purpose microprocessors and can be located anywhere in the world.

The computer system 1200 also includes a main memory 1206, such as a random-access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

The computer system 1200 further includes a read only memory (ROM) 1208 or other static storage device coupled to bus 1202 for storing static information and instructions for processor 1204. A storage device 1210, such as a magnetic disk, optical disk, etc., is provided and coupled to bus 1202 for storing information and instructions.

The computer system 1200 may be coupled via bus 1202 to a display 1212, such as a liquid crystal display (LCD) (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. In some embodiments, the same direction information and command selections as cursor control may be implemented via receiving touches on a touch screen without a cursor.

The computing system 1200 may include a User Interface Module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Python, Ruby on Rails or NodeJS. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor(s) 1204 executing one or more sequences of one or more instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1210. Volatile media includes dynamic memory, such as main memory 1206. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 1200 also includes a communication interface 1218 coupled to bus 1202. Network interface 1218 provides a two-way data communication coupling to one or more network links that are connected to one or more local networks. For example, communication interface 1218 may be an integrated services digital network (ISDN) card, cable modem, satellite modem, or a modem to provide a data communication connection to a corresponding type of telephone line. As another example, network interface 1218 may be a local area network (LAN) card to provide a data communication connection to a compatible LAN (or WAN component to communicate with a WAN). Wireless links may also be implemented. In any such implementation, network interface 1218 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local networks and Internet both use electrical, electromagnetic or optical signals that carry digital data streams. The signals through the various networks and the signals on network link and through communication interface 1218, which carry the digital data to and from computer system 1210, are example forms of transmission media.

The computer system 1200 can send messages and receive data, including program code, through the network(s), network link and communication interface 1218. In the Internet example, a server might transmit a requested code for an application program through the Internet, the ISP, the local network and the communication interface 1218.

The received code may be executed by processor 1204 as it is received, and/or stored in storage device 510, or other non-volatile storage for later execution. In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computer processors, not only residing within a single machine, but deployed across a number of machines.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system, comprising:
   a computer device, wherein the computer device is associated with a user;
   a cloud-based resource communicatively connected to the computer device via a communication network, wherein the cloud-based resource:
   receives a one-touch selection to access a drop-in video session;
   automatically connects the computer device to the selected drop-in video session, wherein the connection enables the user to participate in a two-way video communication in the drop-in video session,
   wherein the computer device accesses software, to enter the one-touch selection to access the drop-in video session; and
   wherein the software generates icons corresponding to a unique uniform resource location (URL) for each of the drop-in video sessions.

2. The system of claim 1, wherein the selection is from a plurality of drop-in video sessions hosted by the cloud-based resource.

3. The system of claim 1, wherein the one-touch selection comprises clicking the icon corresponding to the selected drop-in video session.

4. The system of claim 1, wherein the one-touch selection comprises clicking the icon corresponding to the selected drop-in video session.

5. The system of claim 1, wherein the plurality of drop-in video sessions hosted by the cloud-based resource comprises: open drop-in video sessions; group drop-in video sessions; and exclusive drop-in video sessions.

6. The system of claim 2, wherein the cloud-based resource:
   generates the plurality of drop-in video sessions as continuous video sessions.

7. The system of claim 2, wherein the server:
   generates the plurality of drop-in video sessions to allow participants to join the session from different locations globally.

8. The system of claim 1, wherein the software displays the virtual environment for the selected drop-in video session enabling the user to interact with two-way real-time video streams and audio from other participants in the selected drop-in video session.

9. The system of claim 1, wherein the cloud-based resource and the computer system are included in a cloud-based computing model.

10. The system of claim 1, wherein the computer device comprises at least one of: a tablet computer, smartphone, personal computer, or mobile computer device.

11. A method, comprising:
    receiving a selection of a type of drop-in video session, wherein the selection is received from a user via software accessed by a computer device;
    automatically connecting the computer device to the drop-in video session based on the received selection for the type of drop-in video session, wherein the connection enables the user to participate in a two-way video communication in the drop-in video session; and
    wherein the type of drop-in video session comprises at least one of: exclusive drop-in video session; group drop-in video session; open drop-in video session, and user profile page.

12. The method of claim 11, further comprising:
    in response to receiving the selection of exclusive drop-in video session for the type of drop-in video session, receiving a selection of a sub-type of exclusive drop-in video session.

13. The method of claim 12, wherein the sub-type of exclusive drop-in video session comprises at least one of: live drop-in video session; member drop-in video session; and history drop-in video session.

14. The method of claim 11, further comprising:
    in response to receiving the selection of group drop-in video session for the type of drop-in video session, receiving a selection of a sub-type of group drop-in video session.

15. The method of claim 13, wherein the sub-type of group drop-in video session is based on a specific topic corresponding to each group drop-in video session.

16. The method of claim 11, further comprising:
    in response to receiving the selection of open drop-in video session for the type of drop-in video session, receiving a selection of a sub-type of open drop-in video session.

17. The method of claim 11, further comprising:
    in response to receiving the selection of user profile page for the type of drop-in video session, receiving a selection of a sub-type of drop-in video session based on one or more purchased drop-in video sessions corresponding to the user.

18. A non-transitory computer readable medium comprising instructions, that when read by a processor, cause the processor to perform:

receiving a one-touch selection to access a drop-in video session;

automatically connecting a computer device to the selected drop-in video session, wherein the connection enables a user to participate in a two-way video communication in the drop-in video session; and generating icons corresponding to a unique uniform resource location (URL) for each of the drop-in video sessions.

* * * * *